Jan. 17, 1967  E. S. SALYARDS  3,298,164
HOLD DOWN ASSEMBLY FOR MOWING MACHINES
Filed June 10, 1964

INVENTOR
ELMER S. SALYARDS
BY Dick & Zarley
ATTORNEYS

United States Patent Office 3,298,164
Patented Jan. 17, 1967

3,298,164
HOLD DOWN ASSEMBLY FOR MOWING MACHINES
Elmer S. Salyards, Coal Valley, Ill. 61240
Filed June 10, 1964, Ser. No. 373,937
11 Claims. (Cl. 56—305)

This invention relates to a hold down assembly for mowing machines and more particularly to a hold down assembly having resilient means associated therewith. The resilient means maintain the sickle knives in close contact with the ledger plates and facilitate rapid removal of the cutting bar from the mowing machine in the present improvement.

Conventional mowing machines usually have an elongated supporting bar with guard teeth secured thereto. Ledger plates are secured to the guard teeth to provide a cutting surface for sickle teeth which are mounted on a reciprocating cutting bar. Unless the sickle knives frictionally engage the ledger plates in close engagement, the cutting action will be somewhat less than desirable. The conventional hold down assemblies which presently maintain the cutting bar on the supporting bar do not encourage sufficient contact between the ledger plates and sickle knives. Additionally, it is very difficult to remove the cutting bar from the supporting bar to sharpen or repair the sickle knives due to the numerous hold down assemblies thereon which are usually bolted to the supporting bar.

It is a principal object of this invention to provide a hold down assembly which insures sufficient contact between reciprocating sickle knives and the ledger plates upon which they move to insure positive cutting action.

It is a further object of this invention to provide a hold down assembly for mowing machines which facilitates rapid removal of the cutting bar and sickle knives from the machine.

A further object of this invention is to provide a hold down assembly for mowing machines which has a resilient finger member pivotally secured thereto which may be removed by simply depressing the rearward end thereof and slidably moving said finger member forwardly to facilitate the removal of the cutting bar.

A further object of this invention is to provide a hold down assembly for mowing machines which prevents the accumulation of dirt, grass or other waste matter from accumulating between the sickle knives and the ledger plates upon which they travel.

A still further object of this invention is to provide a hold down assembly for mowing machines which is economical of manufacture, durable in use and refined in appearance.

These and other objects will be apparent to those skilled in the art.

Figure 1:
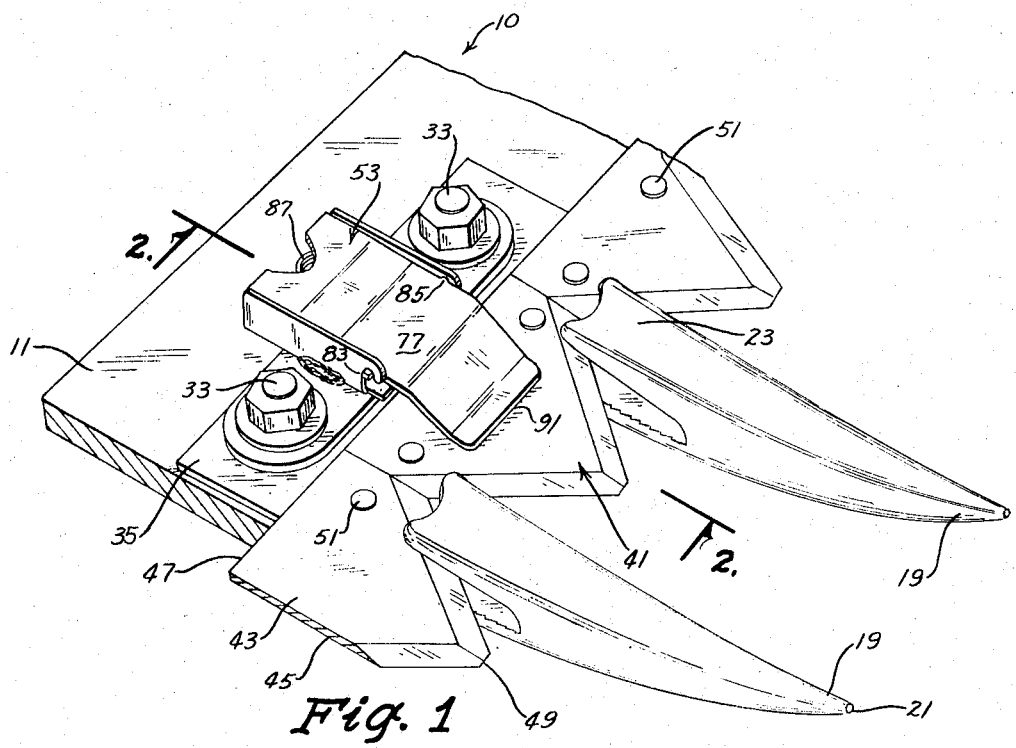
FIG. 1 is a fragmentary perspective view of the hold down assembly mounted on a supporting bar.

The numeral 10 generally designates an elongated supporting bar of a conventional mowing machine having an upper surface 11, lower surface 13, rearward end 15 and forward end 17. Secured to the forward lower surface of supporting bar 10 is a conventional guard tooth 19 having a pointed end portion 21, prong portion 23, notch opening 25, ledger plate supporting surface 27, and rear base portion 29. A ledger plate 31 is mounted on ledger plate supporting surface 27 by any convenient means. A bolt 33 extends through rear base portion 29 and supporting bar 10 to maintain guard tooth 19 thereon as illustrated in FIG. 1.

Figure 2:
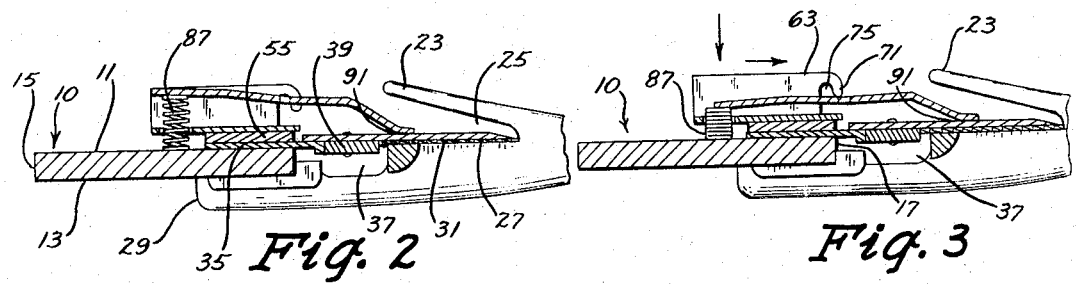
FIG. 2 is a sectional view of the device as seen on line 2—2 of FIG. 1 at a reduced scale.
Figure 3:
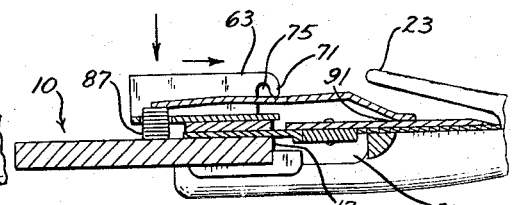
FIG. 3 is a sectional view of the device as seen on line 2—2, illustrating the manner in which the finger member is removed from the hold down assembly, at a reduced scale.
Figure 4:
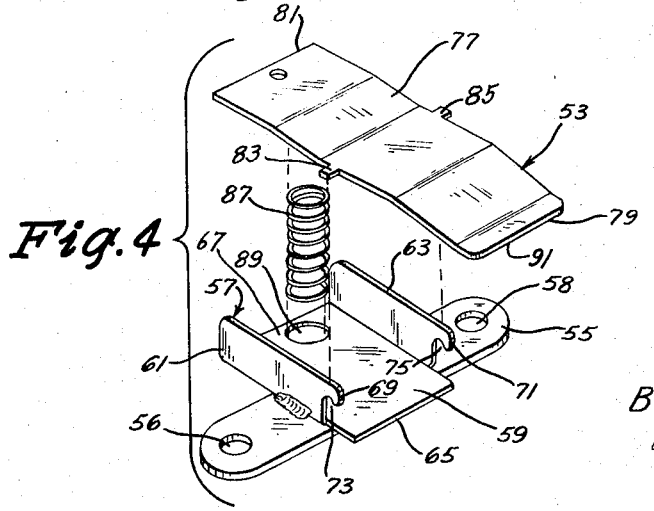
FIG. 4 is an exploded perspective view of the hold down assembly.

A plurality of flat wear plates 35 are secured to the forward upper surface of supporting bar 10 along its length which extend forwardly therefrom as illustrated in FIGS. 2 and 3.

A cutting bar channel 37 is formed in guard tooth 19 between ledger plate supporting surface 27 and rear base portion 29 as illustrated in FIGS. 2 and 3. A cutting bar 39 having a plurality of sickle knives 41 secured thereto is power driven in conventional manner and reciprocates in cutting bar channel 37. Sickle knife 41 is substantially triangular shaped and has a top surface 43, bottom surface 45, rearward end 47 and forward end 49. Sickle knives 41 are secured to cutting bar 39 by rivets 51 extending therethrough. It should be noted that cutting bar 39 is spaced forwardly of rearward end 47 of sickle knife 41 to provide a surface which rests on the upper forward end of wear plate 35 as seen in FIGS. 2 and 3.

The numeral 53 generally designates a hold down assembly mounted on the forward upper surface of supporting bar 10 as illustrated in FIG. 1. Hold down assembly 53 is comprised of an elongated flat plate member 55 having holes 56 and 58 at its opposite ends to receive bolts 33. A channel member 57 is secured to the upper surface of plate member 55 by welding or the like and is comprised of a base member 59, spaced apart vertical wall members 61 and 63 and has forward end 65 and rearward end 67. The forward ends of wall members 61 and 63 have arcuate shaped arm members 69 and 71 respectively, extending forwardly and downwardly therefrom and forming notches 73 and 75 between arm members 69, 71 and wall members 61, 63, respectively.

An elongated finger member 77 having forward end 79 and rearward end 81 is adapted to be received by channel member 57 as illustrated in FIG. 1. Finger member 77 has arm members 83 and 85 extending laterally therefrom along its opposite sides intermediate its length which are received by notches 73 and 75, respectively. A coil spring 87 is mounted on supporting bar 10 and extends upwardly through opening 89 in base member 59 and engages the rearward lower surface of finger member 77 to yieldably maintain the rearward end thereof in an elevated position. The forward end of finger member 77 is provided with a flat bearing surface 91 which frictionally engages the upper surface of sickle knives 41 to yieldably maintain cutting bar 39 and sickle knives 41 on supporting bar 10 and to insure close engagement between sickle knives 41 and ledger plates 31.

The normal method of operation is as follows. Guard teeth 19 will be secured to supporting bar 10 in conventional fashion by means of bolts 33. Wear plate 35 will be installed on the upper surface of supporting bar 10 and secured thereto by means of bolts 33 also. Flat plate 55, together with the hold down assembly 53 will be secured to the upper surface of wear plate 35 by bolts 33 extending through holes 56 and 58.

In the normal operating position, spring 87 will be forcing finger member 77 to pivot as seen in FIG. 2. Bearing surface 91 of finger member 77 will yieldably frictionally engage the upper surface of sickle knives 41, thereby forcing the lower surfaces thereof into close engagement with ledger plates 31. Such close contact insures positive cutting action and prevents dirt, grass or debris from accumulating between knives 41 and ledger plate 31. Arm members 83 and 85 act as a fulcrum for finger member 77.

To remove cutting bar 39 from supporting bar 10, it is simply necessary to depress the rearward end of finger member 77 until arm members 83 and 85 are disengaged from notches 73 and 75, respectively. When arm members 83 and 85 have been lowered from notches 73 and 75, respectively, finger member 77 is simply slidably moved forwardly as illustrated in FIG. 3. When finger member 77 has been completely removed from all the hold down assemblies, the cutting bar may be removed from the mowing machine. It should be noted that any number of hold down assemblies may be used on a particular mowing machine. It is obvious that the hold down assembly just described affords a rapid and simple means for removing cutting bar 39 from the mowing machine. The hold down assembly prevents any vertical play of the cutting bar and sickle knives and as described, insures positive cutting action. The unique arrangement of coil spring 87 extending through opening 89 in base member 59 eliminates the necessity of the spring from being rigidly secured to any part of the evice. By having a portion of the coil spring 87 extending below base member 59, it is obvious that the rearward end of finger member 77 may be depressed to a greater degree.

Finger member 77 would be re-installed on hold down assemblies 53 by merely reversing the steps just described. While the device may be constructed of any suitable material, it is desired that it be constructed of steel or iron.

Thus, from the foregoing it can be seen that the device accomplishes all of its stated objectives.

Some changes may be made in the construction and arrangement of my hold down assembly for mowing machines without departing from the real spirit and purpose of my invention, and it is my intention to cover by my claims, any modified forms of structure or use of mechanical equivalents which may be reasonably included within their scope.

I claim:
1. In a mowing device,
an elongated supporting bar,
a plurality of guard teeth mouted thereon and having ledger plates secured thereto,
a reciprocating cutting bar detachably mounted on said supporting bar,
a plurality of sickle knives secured to said cutting bar and extending into said guard teeth and engaging said ledger plates,
a channel member detachably secured to said elongated supporting bar and having a base portion with two upwardly extending wall members,
an elongated finger member mounted on said channel member and having a forward end and a rearward end with a middle portion therebetween; said forward end frictionally engaging a portion of said sickle knives and said middle portion being held upwardly in pivotal engagement with a portion of said wall members by a downwardly compressible support means, said supporting means pivoting said forward end into frictional engagement with said sickle knives to hold said sickle knives in yieldable engagement with said ledger plates,
said middle portion an said support means being downwardly compressible to a position where said middle portion is disengaged from said portion of said wall member and said finger member is slidably removable from said channel member.

2. The device of claim 1 wherein said compressible support means is comprised of a spring member.

3. In a mowing device,
an elongated supporting bar,
a plurality of guard teeth mounted thereon and having ledger plates secured thereto,
a reciprocating cutting bar removably mounted on said supporting bar,
a plurality of sickle knives secured to said cutting bar and extending into said guard teeth and said ledger plates,
a channel member secured to said supporting bar having a base member and spaced apart wall members extending upwardly therefrom,
a resilient finger member detachably pivotally mounted in said channel member and having opposite ends, one of said opposite ends frictionally engaging said sickle knives at times, and
means in said channel member to pivot said one end of said finger member downwardly into frictional engagement with said sickle knives.

4. The device of claim 3 wherein each of said wall members has a notch formed therein at one end thereof and said finger member has laterally extending arm members detachably pivotally engaging said notches.

5. The device of claim 3 wherein said channel member has a flat plate member secured to its base member which is secured to said supporting bar.

6. In a hold down assembly for mowing machines having an elongated supporting bar with a reciprocating cutting bar means removably mounted thereon,
an elongated substantially U-shaped channel member having a base member with spaced apart side members extending upwardly therefrom, said side walls each having an arcuate arm member extending outwardly and downwardly from one end thereof,
an elongated finger member detachably pivotally mounted in said channel member, and having opposite sides,
said finger member having an arm member extending outwardly from each of its opposite sides extending between said arcuate arm member and said side members,
one end of said finger member frictionally engaging said cutting bar means at times, and
means in said channel member to pivot finger member into frictional engagement with said cutting bar means.

7. The devise of claim 6 wherein said means in said channel member to pivot said finger member into frictional engagement with said cutting bar means at times is comprised of a spring member.

8. In a hold down assembly for mowing machines having an elongated supporting bar with a reciprocating cutting bar means removably mounted thereon,
an elongated substantially U-shaped channel member bers extending upwardly therefrom, said side walls having a base member with spaced apart side members each having an arcuate arm member extending outwardly and downwardly from one end thereof,
an elongated resilient finger member detachably pivotally mounted in said channel member, and having opposite sides,
said finger member having an arm member extending outwardly from each of its opposite sides extending between said arcuate arm member and said side members,
one end of said finger member frictionally engaging said cutting bar means at times,
and means in said channel member to pivot finger member into frictional engagement with said cutting bar means.

9. The device of claim 8 wherein said means in said channel member to pivot said finger member into frictional engagement with said cutting bar means is comprised of a spring member yieldably maintaining said finger member in said frictional engagement and maintaining said cutting bar means on said supporting bar.

10. In a hold down assembly for mowing machines having an elongated supporting bar with a reciprocating cutting bar means detachably mounted thereon,
a channel member detachably secured to said elongated supporting bar and having a base portion with two upwardly extending wall members, an elongated finger member having one end in frictional engagement with a portion of said cutting bar means, being yieldably held upwardly in pivotal engagement with portions of said wall members, and being downwardly compressible to a depressed position whereupon said finger member is slidably removable, and means in said channel member to pivot said one end into frictional engagement with said cutting bar means.

11. In a hold down assembly for mowing machines having an elongated supporting bar with a reciprocating cutting bar means detachably mounted thereon, a channel member detatchably secured to said elongated supporting bar and having a base portion with two upwardly extending wall members, an elongated finger member mounted on said channel member and having a forward end and a rearward end with a middle portion therebetween; said forward end frictionally engaging a portion of said sickle knives and said middle portion being held upwardly in pivotal engagement with a portion of said wall members by a downwardly compressible support means, said support means pivoting said forward end into frictional engagement with said sickle knives thereby holding said sickle knives in yieldable engagement with said ledger plates, said middle portion and said support means being downwardly compressible to a position where said middle portion is disengaged from said portion of said wall member and said finger member is slidably removable from said channel member.

References Cited by the Examiner

UNITED STATES PATENTS

| | | | |
|---|---|---|---|
| 708,146 | 9/1902 | Johnston | 56—305 |
| 731,611 | 6/1903 | Pridemore | 56—305 |
| 3,052,078 | 9/1962 | Padgett | 56—305 |

ABRAHAM G. STONE, *Primary Examiner.*

RUSSELL R. KINSEY, *Examiner.*